(12) United States Patent
Zappa et al.

(10) Patent No.: US 6,541,752 B2
(45) Date of Patent: Apr. 1, 2003

(54) MONOLITHIC CIRCUIT OF ACTIVE QUENCHING AND ACTIVE RESET FOR AVALANCHE PHOTODIODES

(75) Inventors: Franco Zappa, Sesto San Giovanni (IT); Sergio Cova, Milan (IT); Massimo Ghioni, Monza (IT)

(73) Assignee: Politecnico di Milano, Milan (IT)

( * ) Notice: Subject to any disclaimer, the term of this patent is extended or adjusted under 35 U.S.C. 154(b) by 0 days.

(21) Appl. No.: 09/797,974

(22) Filed: Mar. 5, 2001

(65) Prior Publication Data

US 2001/0020673 A1 Sep. 13, 2001

(30) Foreign Application Priority Data

Mar. 9, 2000 (IT) .......................................... MI200A466

(51) Int. Cl.[7] .............................................. H01L 31/00
(52) U.S. Cl. .................................... 250/214.1; 327/422
(58) Field of Search .......................... 250/214 R, 214.1; 327/143, 422, 514, 509

(56) References Cited

U.S. PATENT DOCUMENTS

| 4,945,227 A | * | 7/1990 | Jones et al. ............. 250/214 R |
| 5,194,727 A | * | 3/1993 | Johnson et al. ......... 250/214 R |
| 5,532,474 A | * | 7/1996 | Dautet et al. ........... 250/214 R |

* cited by examiner

Primary Examiner—Stephone B. Allen
Assistant Examiner—Eric J Spears
(74) Attorney, Agent, or Firm—Nixon & Vanderhye, P.C.

(57) ABSTRACT

It is an integrated circuit capable of determining the quenching and the reset of an avalanche photodiode operating in Geiger mode so as to detect single photons falling on the surface of said photodiode. The circuit scheme used makes possible to reduce the size of the circuit down to a single semiconductor chip, to reduce the power dissipation and to reduce the cost of the circuit, at the same time keeping the performance at good level.

15 Claims, 3 Drawing Sheets

MONOLITHIC CIRCUIT OF ACTIVE QUENCHING AND ACTIVE RESET FOR AVALANCHE PHOTODIODES

BACKGROUND

1. Field of the Invention

The present invention refers to a monolithic circuit of active quenching and active reset for avalanche photodiodes.

2. Related Art and Other Considerations

The semiconductor detectors of single photons (Single Photon Avalanche Diode, SPAD) are special avalanche photodiodes operating in Geiger mode, that is at a bias voltage higher than the breakdown voltage, so that it is possible to detect the single photons.

These single photon avalanche diodes represent a definite progress compared to the photomultiplier tubes (PMT) in measurements made by counting the incident photons, thanks to their greater compactness, reliability and ruggedness, to their small dimensions, to the lower bias voltage and thanks to their high detection efficiency in the infrared spectral region (IR) and in the near infrared region (NIR).

The SPAD's are, essentially, p-n junctions capable of being biased at a voltage Va, higher than the breakdown voltage Vbd. At this bias voltage the electric field is so high that the absorption of a single photon can trigger a phenomenon of self-sustainining avalanche multiplication, capable of producing a current signal (of the order of milliamperes) which can be easily distinguished from the noise of the electronic circuits.

The operating principle of the SPAD is conceptually different from that of the usual avalanche photodiodes, biased below the breakdown voltage. In the latter ones, the avalanche multiplication process produces an internal gain that acts like an amplifier of the current generated by the absorption of a photon.

The SPAD behaves like a bistable-type switching circuit. In fact, once the avalanche is triggered, the current continues to flow until the avalanche is quenched by means of lowering the bias voltage below the level of the breakdown voltage. The bias voltage is brought back above the breakdown voltage, to the preset operative level Va, so that another incident photon can be detected. This operation requires a suitable circuit, which is normally defined as quenching circuit.

The known technique proposes as method suitable for obtaining this result a so-called Passive Quenching Circuit (PQC), in which a high value resistance RL (hundreds of KOhm) is inserted in series to the bias voltage generator. Once the avalanche has been started, the current rapidly discharges the capacity of the device, forcing the voltage at the leads of the diode to drop down to a value near to the breakdown voltage. If the RL is sufficiently high, the final current results to be lower than the limit current (of the order of hundreds of microamperes) below which the avalanche is no longer capable of sustaining itself. After the avalanche quenching, the voltage at the leads of the diode is brought back to the bias voltage, but at a much slower rate because the capacity of the diode is charged by the small current that flows through the resistance RL. The reset of the bias voltage follows an exponential law with a time constant that results to be about 1 microsecond or more.

During this slow transient the SPAD can be triggered by another incident photon while it is at an intermediate bias voltage between the breakdown voltage and the preset operative voltage Va. As the detection efficiency of the photons increases with the excess bias voltage Vexc, defined as the difference between the operative bias voltage Va and the breakdown voltage Vbd, during the recovery times there can be counting losses that are difficult to quantify. All this causes a non-linearity in counting the photon number which, the greater the counting rate is, the more marked it becomes.

In fact, the use of PQC circuits is limited to the applications in which the average counting rate does not exceed some thousand counts per second (Kcounts/s).

In order to exceed the limits of the passive quenching circuits, the active quenching circuits AQC have been introduced.

The operating principle of the AQC demands that the leading edge of the avalanche current be detected by a comparator, which produces a standard output pulse synchronized with said edge. The same edge activates a controlled generator that lowers the bias voltage of the SPAD below the level of the breakdown voltage, thus quenching the avalanche. The voltage at the leads of the photodiode is kept low for a preset time interval, at the end of which the bias voltage is rapidly brought back to the operative level Va.

The transition that brings back the bias voltage to the operative level Va must be rapid, to reduce to a minimum the interval of time in which the voltage has not yet reached the preset value Va, but is nevertheless above the level of the breakdown voltage Vbd.

In comparison to the PQC circuits, the AQC have two fundamental advantages: a) the avalanche is always triggered in standard conditions of bias, thus guaranteeing a well-controlled detection efficiency; b) the dead time in which the detector is insensitive is well defined by the user, thus permitting an accurate correction of the data.

Nevertheless the AQC circuits proposed up to now have various drawbacks: the dimensions are not miniaturized, as the circuit schemes are not suitable for implementation in monolithic integrated form; the reliability in applications with harsh environment is insufficient, as the circuits are assembled using discrete components and/or various integrated circuit blocks; the power dissipation is significant even in stand-by conditions, which involves further limitations to miniaturization and to use in portable apparatus.

In view of the state of the technique described, the object of the present invention is to implement a new AQC circuit having a circuit structure such that makes possible its integration in conventional CMOS technology.

SUMMARY

In accordance with the present invention, this object is reached by means of a monolithic circuit of active quenching and active reset for avalanche photodiodes detecting single photons (SPAD), comprising quenching means which are sensitive to the triggering of the avalanche and reset means operating with a preset time delay compared to said quenching means and for a preset length of time, characterized in that said quenching means comprise a first couple of transistors of opposite polarity connected so that they implement a positive feedback action capable of lowering the bias voltage of the photodiode to below the breakdown voltage at every triggering of the avalanche.

In addition, the reset means preferably comprise a second couple of transistors activated with a preset delay and connected so that said positive feedback is interrupted for a preset time duration and the initial bias voltage is reset at the leads of the photodiode.

Thanks to the present invention an AQC circuit can be made with similar dimensions to the SPAD detector so that the entire structure can be integrated on a single chip, the power dissipation can be reduced because there are no circuits operating in linear regime and the costs are reduced, at the same time keeping good performance.

The compactness of the AQC thus achieved enables to fabricate miniaturized multichip modules for photon counting, that can be housed in a single case, for example a standard TO-8 case, that can also include a Peltier cell for controlling the temperature.

In addition, given the reduced dimensions, the photon-counting module can be replicated for employing it in multidetector systems and SPAD matrix systems.

Furthermore, the low power dissipation makes possible to use these circuits in battery-powered systems and is an essential feature for the applications wherein the generation of heat influences the measurements.

BRIEF DESCRIPTION OF THE DRAWINGS

The characteristics and advantages of the present invention will be apparent from the following detailed description of an embodiment thereof, illustrated as non-limiting example in the enclosed drawings, in which.

DETAILED DESCRIPTION

Figure 1:
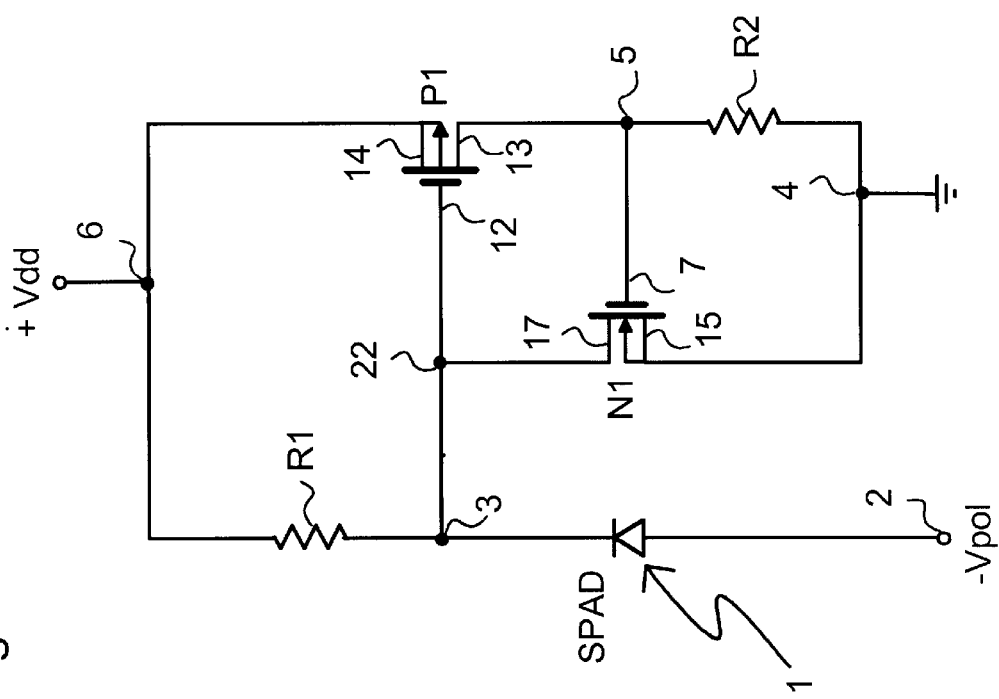
FIG. 1 represents the essential scheme of the active quenching circuit according to the invention.

The essence of a scheme of the active quenching circuit according to the invention is represented in FIG. 1.

The circuit shows the quenching scheme of the avalanche triggered by a photon 1 incident on a SPAD detector having the anode 2 at a negative supply voltage −Vpol and the cathode 3 connected with the circuit node 22. The circuit node 22 is connected with the gate electrode 12 of a P-channel MOS transistor P1, with the drain electrode 17 of a MOS transistor N1, and by means of a resistance R1 is connected with a circuit node 6. The circuit node 6 is connected to the source electrode 14 of the MOS transistor P1 and to which is applied the positive supply voltage +Vdd.

The supply voltage −Vpol, called the basic bias voltage of the SPAD, has a value lower than the breakdown voltage Vbd of the SPAD diode and, preferably, just slightly lower, that is such that (Vbd−Vpol) is much less than Vbd. The supply voltage +Vdd, called the excess bias voltage of the SPAD, has a value selected in order to obtain the desired operative value for the total bias voltage of the SPAD, Va=Vpol+Vdd.

The transistor N1 has its source electrode 15 connected to a circuit node 4 and its gate electrode 7 connected with a circuit node 5. The circuit node 5 is connected to the drain electrode 13 of the transistor P1 and in addition through a resistance R2 it is connected to the circuit node 4. The circuit node 4 is connected to ground.

The transistors P1 and N1 are connected to each other so as to implement a positive local feedback. In quiescent condition, waiting for an incident photon 1, the photodiode SPAD does not carry any current and therefore the voltage drop on the resistance R1 is nil. The transistor P1, therefore, is inhibited, that is, its condition is under threshold, thus preventing the turning on of the transistor N1 because the voltage between the leads of the resistance R2 is zero.

The circuit is therefore in a waiting situation and the reverse bias voltage applied at the leads of the SPAD results: Va =(Vpol ±Vdd)>Vbd, where Vbd is the breakdown voltage of the photodetector device.

When a photon 1 is absorbed, the avalanche in the SPAD photodiode is triggered. The current generated flows in the resistance R1 and causes an increase of the voltage between the gate electrode 12 and source electrode 14 of the transistor P1. If this voltage exceeds the threshold voltage, the transistor P1 enters into conduction, causing an increase of the voltage between the gate electrode 7 and the source electrode 15 of the transistor N1. If this voltage exceeds the threshold voltage, N1 enters into conduction and the current injected on R1 starts a positive feedback action that causes a rapid decrease of the voltage of the drain electrode 17 of N1. The positive feedback stops when both transistors enter the ohmic zone, that is when the voltage between the drain and source electrodes is low.

At this point the voltage of the drain electrode 17 of N1, which is connected with the cathode of the SPAD, is about ground value, and thus causes the quenching of the avalanche as long as the supply voltage −Vpol is lower in absolute value than the breakdown voltage Vbd of the SPAD device.

The circuit in FIG. 1 can be made also with variants in the values of the supply voltages and in their polarity, always keeping the same type of operation. As an example, we herewith give some of such possible variants.

With reference to FIG. 1, the source electrode 15 of the MOS transistor N1 can be connected to a supply voltage Vrif instead of ground, consequently shifting the values of the supply voltages Vdd and −Vpol of the quantity Vrif, so as to have the same bias voltage Va of the SPAD and to ensure that the quenching circuit brings the SPAD voltage below Vbd. In particular, by selecting a suitable value of the voltage Vrif, for example by selecting Vrif =−Vdd, the circuit node 6 to which the source electrode 14 of the MOS transistor P1 is connected can be connected to ground, so that the bias voltage Va of the SPAD is given only by the supply voltage −Vpol.

Figure 2:
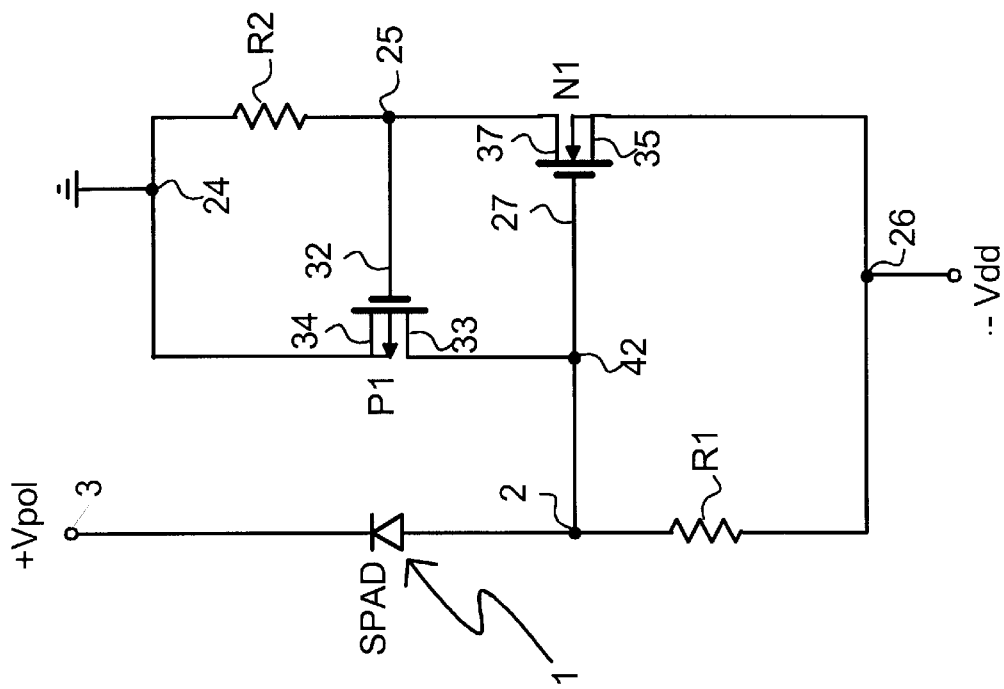
FIG. 2 represents a variant of the essential scheme of the active quenching circuit according to the invention.

Another variant of implementation of the circuit of FIG. 1 is sketched in FIG. 2, obtained using a base positive supply voltage +Vpol and consequently inverting the connections of the SPAD terminals, the signs of the other supply voltages and the polarity of the MOS transistors N1 and P1. More precisely, it is possible to connect the cathode 3 of the SPAD to a positive base supply voltage +Vpol, while the anode 2 is connected with the circuit node 42. The circuit node 42 is connected with the gate electrode 27 of the N-channel MOS transistor Ni, and with the drain electrode 33 of the P-channel MOS transistor P1, and through a resistance R1 it is connected with the circuit node 26. The circuit node 26 is connected to the source electrode 35 of the MOS transistor N1 and to which is applied the negative excess bias voltage −Vdd. The circuit node 25 is connected with the gate electrode 32 of the P-channel transistor P1, with the drain electrode 37 of the N-channel MOS transistor N1, and through the resistance R2 with the circuit node 24. The circuit node 24 is connected the source electrode 34 of the MOS transistor P1. The node 24 is in this instance connected to ground. It is evident that the operation of this circuit is identical to that of the circuit sketched in FIG. 1 as long as the signs of the voltage of the nodes and of the currents in the branches are inverted.

Figure 3:
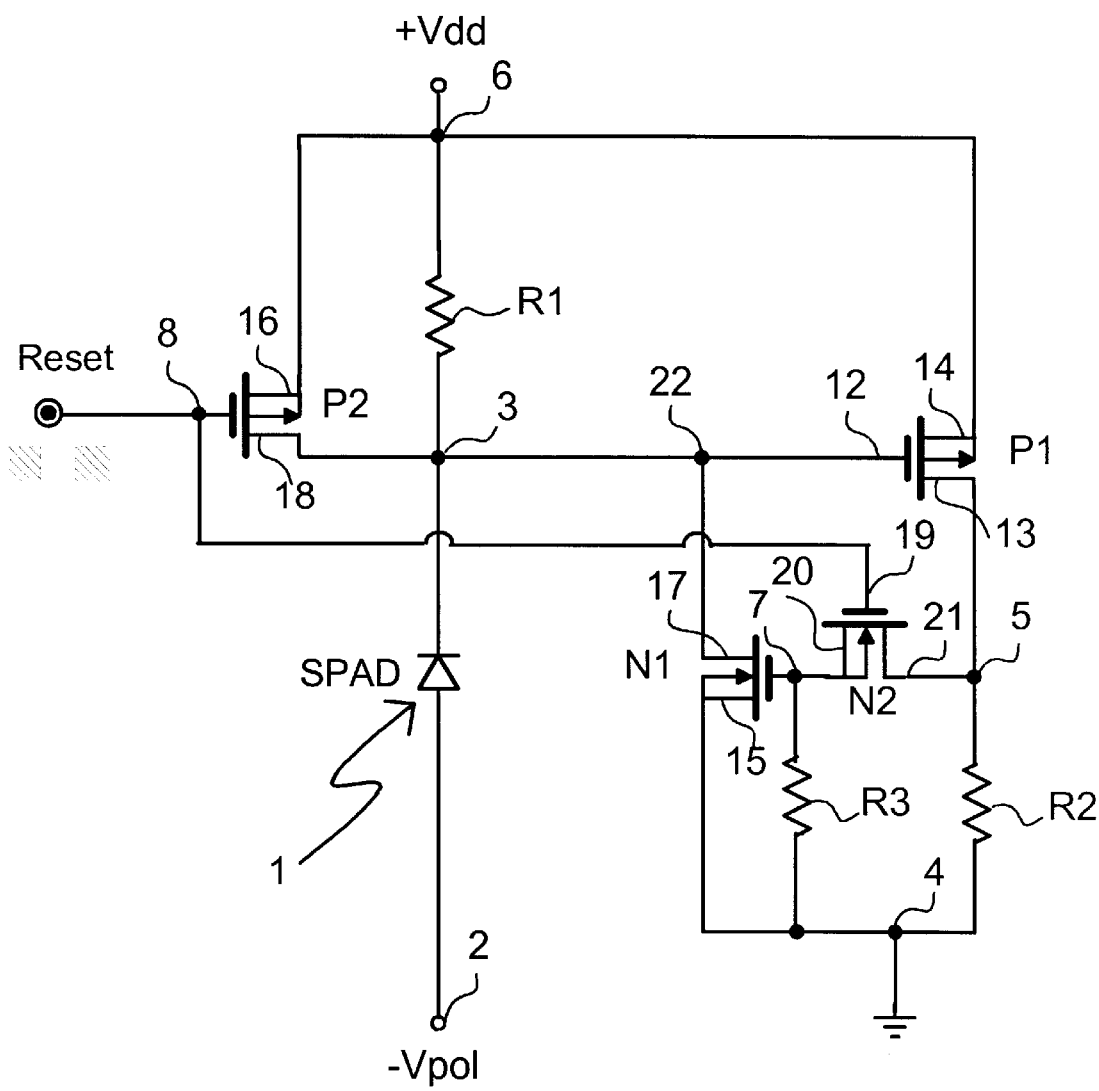
FIG. 3 shows a circuit implementation of the active quenching and reset functions according to the invention.

FIG. 3 shows a circuit implementation of the active quenching and reset functions in accordance with the invention.

A circuit that resets the initial bias conditions of the SPAD photodiode has to be provided, after the SPAD has been held off for a preset time interval hold-off T.

According to what is illustrated in FIG. 3 it can be observed that, in comparison to FIG. 1, an additional couple of MOS transistors P2 and N2 is inserted so that the transistor P2 has its source electrode 16 connected to the circuit node 6, the circuit node 6 in turn being connected to the supply voltage +Vdd. The drain electrode 18 of transistor P2 is connected with the cathode 3 of the SPAD, with the drain of transistor N1, and with the gate of transistor P1, the gate electrode 8 of transistor P2 receives as input a logic signal called the Reset signal. The transistor N2 has its gate electrode 19 connected with the gate 8 of transistor P2 and its source electrode 20 connected to the gate 7 of transistor N1 and with a resistance R3. The resistance R3 is connected to the circuit node 4. The drain electrode 21 of transistor N2 is connected with the drain 13 of transistor P1 and with the resistance R2.

In hold-off conditions after the detection of photon 1, the Reset logic signal, that drives the gate electrodes of the transistors N2 and P2, is kept high, that is at a voltage value equal to Vdd. Therefore the transistor P2 is in switched-off condition while the transistor N2 is in ohmic zone, and therefore short-circuits the gate 7 of N1 with the drain 13 of P1. At the end of the hold-off phase, the Reset signal is lowered for a time interval Treset of a preset duration, so as to cause the turning-off of N2 and the turning-on of P2. The switching-off of N2 interrupts the positive feedback loop, thus permitting the transistor N1 to switch-off rapidly, thanks to the presence of the resistance R3. The switching-on of the transistor P2 in turn rapidly brings back the voltage on cathode 3 of the SPAD to the value +Vdd, thus resetting the initial bias condition, just as it was before the absorption of the incident photon 1.

In the case of implementation of the variant represented in FIG. 2 of the basic diagram of the active quenching circuit, the circuit diagram represented in FIG. 3 must be modified. In this case, since the connections of the SPAD terminals are inverted as well as the signs of the supply voltage and the polarity of the couple of transistors N1 and P1, it is necessary to invert also the polarity of the couple of transistors N2 and P2 and to employ a complementary Reset logic signal, compared to that shown in FIG. 3.

Figure 4:
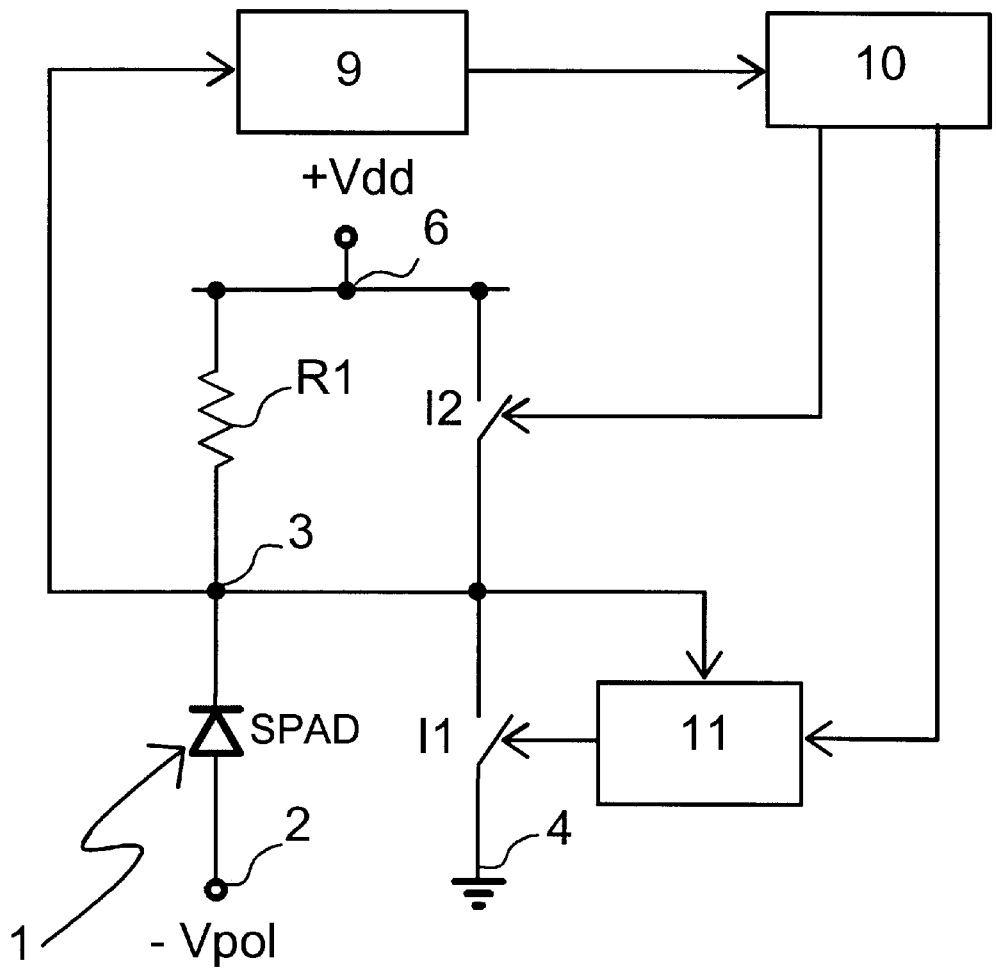
FIG. 4 illustrates the essential diagram of all the functions of the quenching and reset circuit according to the invention.

The essence of the functions of the quenching and reset circuit according to the invention is illustrated in FIG. 4.

According to what is shown in FIG. 4, it can be seen that the switch I1 with the associated positive feedback block 11 represents the effect of the quenching circuit (N1, P1, R2) illustrated in FIG. 1, while the switch I2 represents the reset function (N2, P2, R3) illustrated in FIG. 3. In quiescent conditions, while waiting the incident photon, the switches I1 and I2 are both open. When the absorption of the photon 1 occurs, the avalanche in the SPAD is triggered and the switch Ii is closed, thus causing the quenching of the avalanche. At the leads of the resistance R1 a logic signal is developed, which is delayed by a proper delay block 9, made according to known techniques in CMOS technology. The duration of the delay is equal to the hold-off time, which is adjustable by the user in order to meet the requirements of the specific application and of the measurement set-up.

The delayed logic signal triggers a monostable circuit that has to restore the initial bias conditions, represented by the block 10 and made according to known techniques in CMOS technology, which generates the Reset signal indicated in FIG. 3 and thus acts so as to interrupt for a preset time the positive feedback, represented by block 11, and cause the quenching of the transistor N1, that is, to cause the opening of the switch Ii. In addition said block 10 acts so that the voltage of the cathode 3 of the SPAD is brought back to the value +Vdd, that is, it causes the closing of switch 12.

The time necessary for the voltage at the leads of the photodiode SPAD to return to the initial bias value defines the minimum duration necessary for the Reset signal (Treset), illustrated in FIG. 3.

What is claimed is:

1. A circuit of active quenching and active reset for an avalanche photodiode detector of single photons, the circuit comprising:

an avalanche photodiode;

quenching means sensitive to triggering of the avalanche photodiode; and reset means operating with a preset delay of time with respect to said quenching means and with a preset time duration;

the quenching means comprising a first pair of transistors of opposite doping profiles connected so as to implement a positive feedback capable of lowering the bias voltage of the photodiode below the breakdown voltage at every triggering of the avalanche.

2. A circuit according to claim 1, wherein the reset means preferably comprises a second pair of transistors activated with a preset time delay and connected so as to interrupt for a preset time duration said positive feedback and reset the initial bias voltage at the leads of the photodiode.

3. A circuit according to claim 1, wherein the photodiode has its anode electrode at a negative supply voltage and that its cathode electrode connected to a positive supply voltage through at least one resistance, wherein a first transistor of the first pair of transistors has its gate electrode connected to a drain electrode of a second transistor of the first pair, wherein the second transistor of the first pair has its gate electrode connected to the drain electrode of the first transistor of the first pair, a source electrode of the first transistor of the first pair being connected to ground, a source electrode of the second transistor of the first pair being connected to the positive supply.

4. A circuit according to claim 1, further comprising a second pair of transistors, and wherein a first transistor of the second pair and a second transistor of the second pair have their gate electrodes connected to each other, and a source electrode of the second transistor of the second pair is connected to the positive supply.

5. A circuit according to claim 1, further comprising a second pair of transistors, and wherein the first and second pairs of transistors are arranged so that:

the drain electrode of a second transistor of said second pair is connected to (1) the gate of the transistor of said first pair of a same doping profile, (2) to the drain of the transistor of said first pair of an opposite doping profile, and (3) to the cathode of the avalanche photodiode, the gate electrode of a first transistor of the first pair is connected to the source of the transistor of the same doping profile of the said second pair, the drain electrode of the first transistor of said second pair is connected to the drain of the transistor of the opposite doping profile of said first pair.

6. A circuit according to claim 1, wherein the photodiode has its anode electrode at a negative supply voltage and its cathode electrode connected to a positive supply voltage by means of at least one resistance, and wherein a first transistor of the pair of transistors has its gate electrode connected to drain electrode of a second transistor of the pair, a source electrode of the first transistor of the pair being connected to a reference supply and a source electrode of the second transistor of the pair being connected to a positive supply.

7. A circuit according to claim 1, wherein the photodiode has its cathode electrode connected to a positive supply voltage and its anode electrode connected to a negative supply by means of at least one resistance, and wherein a first transistor of the pair has its gate electrode connected to the drain electrode of a second transistor of the pair, the source electrode of the first transistor being connected to a negative supply, the gate electrode of the second transistor and the drain electrode of the first transistor being connected to each other and in addition connected to ground by means of at least one resistance, and the source electrode of the second transistor of the pair being connected to ground.

8. A circuit according to claim 1, further comprising means for keeping said avalanche photodiode insensitive to the incident photon for a precisely defined period of time.

9. A circuit according to claim 8, wherein the means for keeping the avalanche photodiode insensitive comprises a circuit that delays the reset.

10. A circuit according to claim 9, wherein the circuit that delays the reset is implemented using CMOS technology.

11. A circuit according to claim 1, wherein the preset time duration of the reset means is given by a monostable circuit.

12. A circuit according to claim 11, wherein the monostable circuit is implemented using CMOS technology.

13. A circuit according to claim 1, wherein the transistors are made in CMOS technology.

14. A circuit according to claim 1, wherein the transistors of the first pair are CMOS transistors, wherein one the transistors of the pair is an n-channel transistor and another of the transistors of the pair is a p-channel transistor.

15. A circuit according to claim 1, wherein the transistors of the first pair are bipolar transistors, wherein one the transistors of the pair is of an n-p-n type and another of the transistors of the pair is of a p-n-p type.

* * * * *